__United States Patent Office__

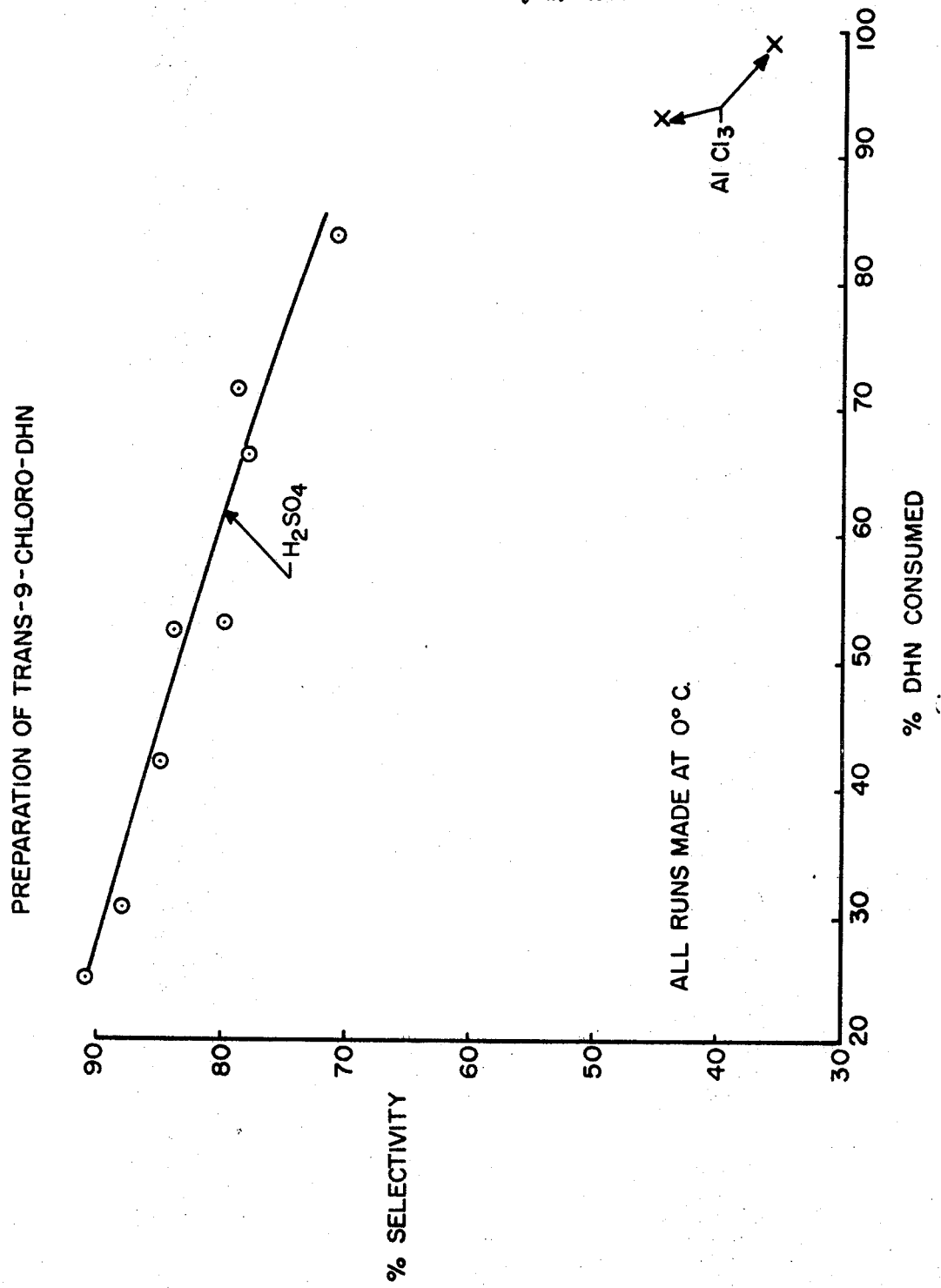

3,577,469
Patented May 4, 1971

3,577,469
PREPARATION OF 9-HALODECAHYDRO-NAPHTHALENE
Abraham Schneider, Overbrook Hills, Pa., assignor to Sun Oil Company, Philadelphia, Pa.
Filed May 2, 1968, Ser. No. 726,132
Int. Cl. C07c 7/10, 23/36
U.S. Cl. 260—648                    15 Claims

ABSTRACT OF THE DISCLOSURE

Cis-decahydronaphthalene is converted to trans-9-chlorodecahydronaphthalene, or to the corresponding bromine or fluorine analogue, in a highly selective reaction with $C_4$–$C_5$ tertiary alkyl chloride, bromide or fluoride. The reaction is effected by contacting a mixture of the reactants with 90–100% $H_2SO_4$ at −20° C. to 25° C., preferably at −10° C. to 10° C.

CROSS REFERENCE TO RELATED APPLICATION

My copending application Ser. No. 715,958, filed Mar. 26, 1968, describes a procedure for monohalogenating alkyladamantane hydrocarbons by reaction with a $C_4$–$C_5$ tertiary alkyl chloride, bromide or fluoride, using 90–100% sulfuric acid as catalyst at relatively low temperature. The process of the present application utilizes a similar procedure for the selective monohalogenation of cis-decahydronaphthalene.

BACKGROUND OF THE INVENTION

This invention relates to the conversion of cis-decahydronaphthalene to trans-9-halodecahydronaphthalene in which the halogen is chlorine, bromine or fluorine. For convenience herein, the letters "DHN" are used to designate decahydronaphthalene. More specifically, the invention is concerned with the reaction of cis-DHN with a $C_4$–$C_5$ tertiary alkyl chloride, bromide or fluoride under selective conditions which produce trans-9-chloro-, trans-9-bromo- or trans-9-fluoro-DHN as the major conversion product.

Reaction of cis-DHN with tertiary butyl chloride or bromide has been described heretofore in U.S. Pat. No. 2,629,748. The catalyst disclosed for effecting the reaction was $AlCl_3$ or $AlBr_3$, with reaction temperatures taught as being in the range of −20° C. to 50° C. It was presumed that the main halogenation product was 9-chloro-DHN or 9-bromo-DHN, although no data showing this to be the case were actually presented.

Duplication of the procedure of the foregoing patent has now shown that the conditions employed yield mainly secondary halo derivatives of DHN rather than the 9-halo product. For example, the reaction of t-butyl chloride and cis-DHN at 0° C. by means of $AlCl_3$ typically gives say 60 parts of secondary chloro DHNs (a mixture of isomers) for 40 parts of 9-chloro-DHN produced. This reaction also produces substantial amounts of dichloro products.

The present invention provides an improved way of converting cis-DHN to its 9-chloro or 9-bromo derivative, whereby considerably greater selectivity for positioning the halogen at the tertiary instead of secondary carbon atom is achieved. The invention also applies to the conversion of cis-DHN to its 9-fluoro derivative.

SUMMARY OF THE INVENTION

The process of the invention comprises contacting a mixture of cis-DHN and a $C_4$–$C_5$ tertiary alkyl chloride, bromide or fluoride at a temperature in the range of −20° C. to 25° C., preferably −10° C. to 10° C., with sulfuric acid having a strength in the range of 90–100% $H_2SO_4$ by weight, preferably 94–99% $H_2SO_4$. The sulfuric acid promotes a hydrogen-halogen interchange reaction between a tertiary hydrogen atom (9-position) of the DHN and the chlorine, bromine or fluorine atom of the alkyl halide, without also causing isomerization of the halogen substituent on the DHN nucleus to occur to an inordinate degree. A cis-trans isomerization does take place during the reaction, so that the major product recovered from the reaction mixture is the trans-9-halo-DHN.

BRIEF DESCRIPTION OF THE DRAWING

The accompanying drawing is a plot showing, for the present process, the selectivity in converting cis-DHN to trans-9-chloro-DHN as a function of the percent cis-DHN consumed during reaction. For comparison, two data points are also included to show the selectivity versus cis-DHN consumption relationship for the prior art reaction wherein $AlCl_3$ is used as the catalyst.

DESCRIPTION OF THE INVENTION

The decahydronaphthalene (DHN) used in the present process specifically must be cis-DHN, as trans-DHN is practically inert under the reaction conditions employed. Cis-DHN can be obtained from naphthalene by hydrogenating the latter using, for example, Adam's catalyst (platinum oxide) in the presence of acetic acid at say 50° C. and a hydrogen pressure of 200 p.s.i.

The halogenating agent employed is a $C_4$ or $C_5$ tertiary alkyl chloride, bromide or fluoride or, in other words, t-butyl or t-amyl chloride, bromide or fluoride. Mixtures of these halogenating agents can be used, although it is generally preferable to use a single halogenating agent and usually t-butyl chloride is preferred. The ratio of halogenating agent to cis-DHN in the starting mixture is not critical and can range, for example, from 1:5 to 20:1 moles of halogenating agent per mole of cis-DHN. However an excess of the halogenating agent is desirable and it is generally preferred that the ratio be in the range of 2:1 to 10:1. After the reaction is completed, any unreacted halogenating agent can be recovered and recycled.

The catalyst is sulfuric acid having a strength in the range of 90–100% $H_2SO_4$, preferably 94–99% $H_2SO_4$. Strength as herein used is calculated on an oragnic matter-free basis and relates to the proportion of $H_2SO_4$ to water present. The catalyst constitutes a liquid phase separate from the oragnic phase, and the rate of conversion depends upon the intimacy of contacting the two phases. Good agitation expedites conversion and an increase in the ratio of the acid phase to the organic phase also increases the rate of conversion. Usually a volume ratio of acid to organic phase in the range of 1:2 to 20:1 is employed and a ratio in the range of 2:1 to 10:1 is preferred.

Contacting of the two phases should be continued for a time sufficient to secure a satisfactory degree of conversion of cis-DHN to the trans-9-halo product but not so long as to allow equilibration of the halo product to take place to any large extent. This equilibration reaction will result in the conversion of the 9-halo product (i.e., the kinetic product) to its secondary halo isomers. However, this fortunately takes place slowly when sulfuric acid is the catalyst, so that the use of sulfuric acid, unlike $AlCl_3$ or $AlBr_3$, allows a high degree of conversion of the cis-DHN to be reached without an inordinate proportion of secondary halo product being formed. In other words, a high selectivity in the reaction of the present invention is achieved, as illustrated by the accompanying drawing discussed in more detail hereinafter.

The temperature for carrying out the process lies in the range of −20° C. to 25° C. It is distinctly preferable to operate at a temperature level in the range of −10° C.

to 10° C. and the optimum temperature appears to be about 0° C.

The optimum reaction time for obtaining a good yield of the desired kinetic product (9-halo-DHN) while avoiding formation of the secondary halo isomers varies depending upon such factors as reaction temperature, ratio of sulfuric acid to organic phase and degree of agitation. As a general rule, reaction times of between 5 and 180 minutes are utilized and more usually the reaction is stopped at times in the range of 10–60 minutes. Ordinarily for such reaction periods a substantial proportion of the cis-DHN feed material may remain unconverted but this can be recovered from the reaction mixture and recycled.

As a specific illustration of the process, 10 parts (by weight) of cis-DHN is dissolved in 30 parts of t-butyl chloride, and the solution is cooled to 0° C. and contacted at that temperature with 450 parts of 96% $H_2SO_4$ present as a separate phase. The mixture is agitated at 0° C. for about 30 minutes, during which time isobutane is formed and partly evolves. The reaction that mainly takes place can be represented by the following equation (most hydrogen atoms being omitted):

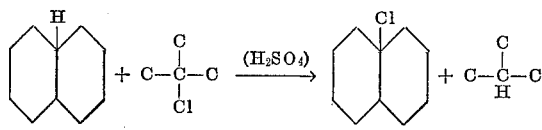

As indicated by the equation, a hydrogen atom at the 9-position and the chlorine atom exchange places to form the desired product along with isobutane. While not depicted by the equation, the DHN structure simultaneously changes from the cis form to the trans form so that the kinetic product of the reaction is trans-9-chloro-DHN. Excessive contact of this material with the sulfuric acid catalyst would cause it to isomerize and thereby convert largely to secondary chloro-DHN's. In order to minimize this equilibration reaction contacting of the phase is terminated while the trans-9-chloro-DHN is the main product.

The reaction shown in the foregoing equation can be expedited by allowing the product isobutane to vaporize as it is formed. Hence it is generally desirable to operate at about atmospheric pressure so that the isobutane can escape from the reaction zone as it forms. However, the reaction can, if desired, also be carried out under pressure in a closed system, the pressure being dictated by the vapor pressure of the reaction mixture.

The 9-chloro, 9-bromo or 9-fluoro product of the present process is useful as an intermediate in the preparation of the dibasic acid, sebacic acid. The latter has well known utility in the preparation of polymers and also in the production of synthetic ester lubricants as described, for example, in Synthetic Lubricants by Gunderson and Hart (Reinhold Publishing Corp.—1962), pages 39–43 and 151–152. Conversion of the 9-halo-DHN to sebacic acid first involves dehydrohalogenation to form 9,10-octalin, such reaction being carried out, for example, in the manner of the dehydrohalogenation reactions described in U.S. Pat. 3,240,834. The 9,10-octalin can then be oxidized to Δ-ketosebacic acid by means of potassium permanganate as described by Hückel et al. Ann., 474, 125 (1929). Finally the ketodibasic acid can be subjected to a Clemmensen reduction via zinc and hydrochloric acid to yield sebacic acid.

The invention is specifically illustrated by examples presented below in which the starting reactants are cis-DHN and t-butyl chloride. Example I is included for comparative purposes and shows the results obtained when $AlCl_3$ is used as the catalyst at 0° C. Examples II-V illustrate the use of sulfuric acid in accordance with the invention.

The results of these examples are also plotted in the accompanying drawing which shows the relationship between "selectivity" and the percent of the cis-DHN feed that is consumed in the reaction. The term "selectivity" as used herein refers to the production of trans-9-chloro-DHN and can be defined as the percent of the consumed cis-DHN equivalent to the trans-9-chloro-DHN in the product analyzed.

In the examples which follow, analyses of products were done by VPC and results have been recalculated to exclude unreacted DHN and all lower boiling materials.

EXAMPLE I (Comparative example using $AlCl_3$)

A mixture of (by weight) about 71% t-butyl chloride and 29% cis-DHN was prepared (molar ratio=3.6) and 5 ml. (4.4 g.) thereof was cooled to 0° C. and stirred vigorously while 0.11 g. of $AlCl_3$ was added. The $AlCl_3$ immediately formed a liquid complex having an orange color. Agitation at 0° C. was continued and samples of the hydrocarbon phase were taken at total times of 1.5 and 20 minutes and analyzed. Results are given in Table 1, wherein the compositions of product are expressed as weight percent based on total product that boiled above the feed DHN. The table also shows percent DHN consumed and the "selectivity" as defined above.

TABLE 1

| Total reaction time, minutes | 1.5 | 20 |
|---|---|---|
| DHN consumed, percent | 93 | 99 |
| Composition of product, percent: | | |
| Trans-9-chloro-DHN | 44.2 | 35.2 |
| Secondary chloro-DHNs | 48.6 | 56.9 |
| Dichloro-DHNs | 7.2 | 7.9 |
| Selectivity, percent | 45 | 36 |

The tabulated data show that use of $AlCl_3$ as catalyst gives secondary chloro DHNs as the major product even at a reaction time of only 1.5 minutes, and it also causes a substantial amount of dichloro products to be formed. The two selectivity values are plotted as points in the accompanying drawing.

EXAMPLE II-A

The reaction mixture was composed of 10.0 ml. of 96% $H_2SO_4$ and 2.0 ml. of a mixture of t-butyl chloride and cis-DHN having the same composition as in Example I. The volume ratio of acid phase to organic phase was 5. The mixture in a stoppered bottle was shaken a 0° C. for total times of 10, 20 and 30 minutes and samples were taken after each reaction period and analyzed. Sampling required opening of the bottle, allowing some of the isobutane that had formed to escape each time. Results are shown in Table 2.

EXAMPLE II-B

Example II-A was repeated except that samples of the reaction mixture were taken at total times of 40 and 70 minutes and not at the earlier times. Results are also listed in Table 2.

TABLE 2

| | Example II-A | | | Example II-B | |
|---|---|---|---|---|---|
| Total reaction time, minutes | 10 | 20 | 30 | 40 | 70 |
| DHN consumed, percent | 30.6 | 52.5 | 66.4 | 71.5 | 83.7 |
| Composition of product, percent: | | | | | |
| Trans-9-chloro-DHN | 87.5 | 84.3 | 78.3 | 79.1 | 71.2 |
| Secondary chloro-DHNs | 12.5 | 15.7 | 21.7 | 20.0 | 27.8 |
| Dichloro-DHNs | | Trace | Trace | 0.9 | 1.0 |
| Selectivity, percent | 88 | 84 | 78 | 79 | 71 |

Comparison of these results with those obtained for $AlCl_3$ (Table 1) shows the marked superiority of sulfuric acid for producing the desired trans-9-chloro-DHN. As can be seen, sulfuric acid gives a high selectivity for this product and, unlike $AlCl_3$, causes very little dichloro products to be formed. The selectivity values of Table 2 are also plotted in the accompanying drawing.

EXAMPLE III

Another run using concentrated sulfuric acid (96% $H_2SO_4$) was carried out in generally the same fashion as in Example II-A, using 3.0 ml. of cis-DHN (2.69 g.; 0.0195 mole), 3.0 ml. of t-butyl chloride (2.54 g.; 0.0254 mole), and 10 ml. of the acid. In this case the molar ratio of t-butyl chloride to cis-DHN was about 1.3 and the volume ratio of acid phase to organic phase was 1.67. The mixture was shaken at 0° C. for a relatively long time, viz 254 minutes, and the organic phase was then analyzed. Results are shown in Table 3.

EXAMPLE IV

The reaction mixture in this run consisted of 10 ml. of 96% $H_2SO_4$, 2 ml. (1.68 g.; 0.0182 mole) of t-butyl chloride, and 3 ml. (2.96 g.; 0.019 mole) of cis-DHN. The molar ratio of t-butyl chloride to cis-DHN was 0.96, and the volume ratio of acid phase to organic phase was 2. The reaction was carried out at 0° C. for 25 minutes, and results also are shown in Table 3.

EXAMPLE V

This run differs from Example IV only in that the amount of t-butyl chloride was reduced to 1 ml. (0.84 g.; 0.0091 mole) and the reaction time was 75 minutes. Molar ratio of t-butyl chloride to cis-DHN was 0.48, and volume ratio of acid to organic material was 2.5. Results again are shown in Table 3.

TABLE 3

|  | Examples | | |
| --- | --- | --- | --- |
|  | III | IV | V |
| Total reaction time, minutes | 254 | 25 | 75 |
| DHN consumed, percent | 53 | 25 | 42 |
| Composition of product, percent: | | | |
| Trans-9-chloro-DHN | 79.9 | 90.9 | 84.2 |
| Secondary chloro-DHNs | 19.7 | 9.1 | 15.4 |
| Dichloro-DHNs | 0.4 | Trace | 0.4 |
| Selectivity, percent | 80 | 91 | 85 |

The selectivity values shown in Table 3 likewise have been plotted in the drawing against percent DHN consumed.

From the drawing it can be seen that a good correlation is obtained between selectivity and DHN consumed for all runs using concentrated sulfuric acid at 0° C. High selectivity in conversion to cis-DHN to the desired 9-chloro product was obtained in all runs, with selectivity values ranging from about 70 to 90%. In contrast, the comparative results for employing $AlCl_3$ show relatively poor selectivities. Even when the lowest practicable reaction time (1.5 minutes) was used, the selectivity was only 45%.

When tertiary amyl chloride or a $C_4-C_5$ tertiary bromide or fluoride is substituted for t-butyl chloride in the foregoing examples, substantially equivalent results are obtained.

The use of sulfuric acid as a catalyst for effecting a hydrogen-halogen exchange reaction between tertiary butyl chloride and acyclic hydrocarbons (branched paraffins) has been described heretofore in Wiese U.S. Pat. No. 2,831,036. However, for this reaction the patent teaches that hydrogen chloride at a partial pressure of 0.1-5 atmospheres should be used. This is necessary in order to suppress undesirable side reactions such as dehydrohalogenation, disproportionation and cracking. In contrast, the reaction of the present invention will proceed nicely without any necessity for applying HCl pressure in the system to avoid such side reactions.

I claim:
1. Method of preparing 9-halodecahydronaphthalene in which the halogen is chlorine, bromine or fluorine which comprises contacting a mixture of cis-decahydronaphthalene and a $C_4-C_5$ tertiary alkyl chloride, bromide or fluoride at a temperature in the range of —20° C. to 25° C. with sulfuric acid having a strength in the range of 90–100% $H_2SO_4$ and recovering 9-halodecahydronaphthalene from the reaction mixture.
2. Method according to claim 1 wherein the $C_4-C_5$ tertiary alkyl reactant is tertiary butyl chloride.
3. Method according to claim 2 wherein said strength is in the range of 94–99% $H_2SO_4$.
4. Method according to claim 3 wherein said temperature is in the range of —10° C. to 10° C.
5. Method according to claim 3 wherein the molar ratio of tertiary butyl chloride to cis-decahydranaphthalene is in the range of 2:1 to 10:1.
6. Method according to claim 5 wherein said temperature is in the range of —10° C. to 10° C.
7. Method according to claim 1 wherein the $C_4-C_5$ tertiary alkyl reactant is tertiary butyl bromide.
8. Method according to claim 7 wherein said strength is in the range of 94–99% $H_2SO_4$.
9. Method according to claim 8 wherein said temperature is in the range of —10° C. to 10° C.
10. Method according to claim 9 wherein the molar ratio of tertiary butyl bromide to cis-decahydronaphthalene is in the range of 2:1 to 10:1.
11. Method according to claim 10 wherein said temperature is in the range of —10° C. to 10° C.
12. Method according to claim 1 wherein the $C_4-C_5$ tertiary alkyl reactant is tertiary butyl fluoride.
13. Method according to claim 12 wherein said strength is in the range of 94–99% $H_2SO_4$.
14. Method according to claim 13 wherein said temperature is in the range of —10° C. to 10° C.
15. Method according to claim 14 wherein the molar ratio of tertiary butyl fluoride to cis-decahydronaphthalene is in the range of 2:1 to 10:1.

References Cited
UNITED STATES PATENTS

| 2,810,001 | 10/1957 | Wiese | 260—648 |
| 2,629,748 | 2/1953 | Condon | 260—648 |

DANIEL D. HORWITZ, Primary Examiner